(12) United States Patent  
Sprenger et al.

(10) Patent No.: US 7,187,533 B2
(45) Date of Patent: Mar. 6, 2007

(54) STATIC CHARGE NEUTRALIZER

(75) Inventors: Gregory S. Sprenger, Colorado Springs, CO (US); Michael J. Gish, Colorado Springs, CO (US)

(73) Assignee: Velcon Filters, Inc., Colorado Springs, CO (US)

( * ) Notice: Subject to any disclaimer, the term of this patent is extended or adjusted under 35 U.S.C. 154(b) by 389 days.

(21) Appl. No.: 10/432,664

(22) PCT Filed: Dec. 10, 2001

(86) PCT No.: PCT/US01/47823

§ 371 (c)(1),
(2), (4) Date: May 23, 2003

(87) PCT Pub. No.: WO02/51215

PCT Pub. Date: Jun. 27, 2002

(65) Prior Publication Data

US 2004/0066600 A1    Apr. 8, 2004

Related U.S. Application Data

(60) Provisional application No. 60/256,766, filed on Dec. 19, 2000.

(51) Int. Cl.
*H02H 3/00* (2006.01)

(52) U.S. Cl. ..................................... 361/213; 361/230

(58) Field of Classification Search ............... 361/216, 361/231, 230, 215, 213; 210/313
See application file for complete search history.

(56) References Cited

U.S. PATENT DOCUMENTS

| 3,383,560 A | | 5/1968 | Ginsburgh | |
|---|---|---|---|---|
| 5,380,432 A | * | 1/1995 | Brandt | ........................ 210/243 |
| 5,898,559 A | | 4/1999 | Smith | |
| 6,099,726 A | | 8/2000 | Gembolis | |
| 6,145,391 A | | 11/2000 | Pui | |
| 6,464,870 B1 | * | 10/2002 | Castellanos et al. | ........ 210/243 |
| 6,474,573 B1 | * | 11/2002 | Kelly | ........................ 239/690 |

\* cited by examiner

*Primary Examiner*—Stephen W. Jackson
(74) *Attorney, Agent, or Firm*—Fraser Martin & Miller; Donald R. Fraser

(57) ABSTRACT

A passive device to neutralize electrostatic charging of fuel when it exists a filter monitor cartridge is described. Filter cartridges containing light filter media generate electrostatic charges, which flow with the fuel as it exists the filter. The device neutralizes the charges as the charges fuel exits the filter/monitor using corona discharge.

7 Claims, 3 Drawing Sheets

STATIC CHARGE NEUTRALIZER

This application claims the benefit of U.S. Provisional Patent Application Ser. No. 60/256,766 filed Dec. 19, 2000.

BACKGROUND OF THE INVENTION

1. Field of the Invention

This invention relates to a method and apparatus for minimizing the electrostatic charges developed in transient flowing fluids, such as hydrocarbon fuels, using the corona discharge method.

The accumulation of electrical charges in a moving fluid has long been a problem to the safe handling of flammable liquids. There are numerous instances where static charges have accumulated to levels high enough to cause a discharge of sufficient intensity that ignition of the flammable liquid resulted.

The most prevalent of the electrostatic-induced accidents has been in connection with tank truck and storage vessel loading operations. The spark discharge in such instances occurs between the surface of the charged fluid in the tank or vessel and some component of the tank or vessel system such as reinforcing members, gauge markers, or the loading spout. This type of sparking is internal and can occur whether or not the tank or vessel is grounded to the loading pipe assembly.

A number of methods have been employed to reduce the safety hazards involved in handling flammable hydrocarbon fluids. Among them are: (a) relaxation tanks wherein the charge on the liquid is allowed to dissipate naturally, in the absence of air, before the liquid enters the receiving tanks (b) the use of a static dissipater additive to increase the conductivity of the liquid and thereby promote the rapid dissipation of charge, and (c) the static charge neutralizer, which employs pointed electrodes protruding from a plastic lining of a pipe into the flowing liquid to dissipate the charge by means of a lightning rod effect. Relaxation tanks are impractical where low-conductivity liquids must be moved at high flow rates since the size of the tank required to reduce the charge on the liquid to a safe level becomes prohibitively large. Although the static dissipater additive protects the product during all phases of handling, it does have the disadvantage of interfering with the water separator characteristics in the instances where it's being used on a fuel. The static charge neutralizer employs a continuous corona inside the moving liquid to neutralize the charge.

As the quality of hydrocarbon products has improved, there has been increased demand for product cleanliness. As a result, filtering arrangements are being used in many liquid-hydrocarbon-handling systems. However, the filter is possibly the greatest single cause of static electricity buildup in such liquid-handling systems. This is mainly due to its large surface area which allows great amounts of charge separation at the filter surface and liquid interface. This mechanism results in the generation of high electrostatic charges. Also, there is a tendency to locate filters close to the loading point. The consequence of this is that when the liquid is discharged into a tank or vessel it is in a highly charged and dangerous condition.

2. Description of the Prior Art

U.S. Pat. No. 3,619,718 to Leonard discloses charge reduction methods utilizing the triboelectric effect of differing materials. Materials such as material made of glass tend to develop a positive electrostatic charge, while materials containing polyester resins tend to develop negative electrostatic charge. The electrostatic charge can be neutralized inside the cartridge by using materials which tend to develop opposite charges of opposite polarity. However, filter media vary in fiber diameter, density, surface coatings, etc. which makes this approach very difficult in practice. In addition, industry qualification specifications require these filters to perform a variety of functions, which limit the opportunity to utilize the triboelectric effect in filter design.

Attempts have been made to neutralize the electrostatic charge by utilizing filters which impart opposite charges to the transient fluid as disclosed in U.S. Pat. No. 3,619,718, and were found to be unsuccessful.

It is an object of the present invention to produce an apparatus which will minimize the safety hazard caused by static electricity building in moving liquids.

Another object of the invention is to produce an apparatus which will prevent the buildup of electrostatic charges to levels high enough to cause an ignition spark in liquid hydrocarbon handling systems.

Still, a further object of the invention is to produce an apparatus to effect a neutralization of accumulated electrostatic charge upon a flowing hydrocarbon liquid.

SUMMARY OF THE INVENTION

The above objects and advantages of the invention can be achieved by an apparatus for neutralizing the electrostatic charge in hydrocarbon fluids comprising a mass of filter material; an electrical conductor; means for directing the flow of fuel to be treated through the mass of filter material and in electrical contact with said conductor; and means for electrically grounding the electrical conductor.

BRIEF DESCRIPTION OF THE DRAWINGS

The above as well as other objects and advantages of the invention will become readily apparent to those skilled in the art from reading the following detailed description of an embodiment of the invention when considered in the light of the accompanying drawings in which.

DETAILED DESCRIPTION OF THE PREFERRED EMBODIMENT

Figure 1:
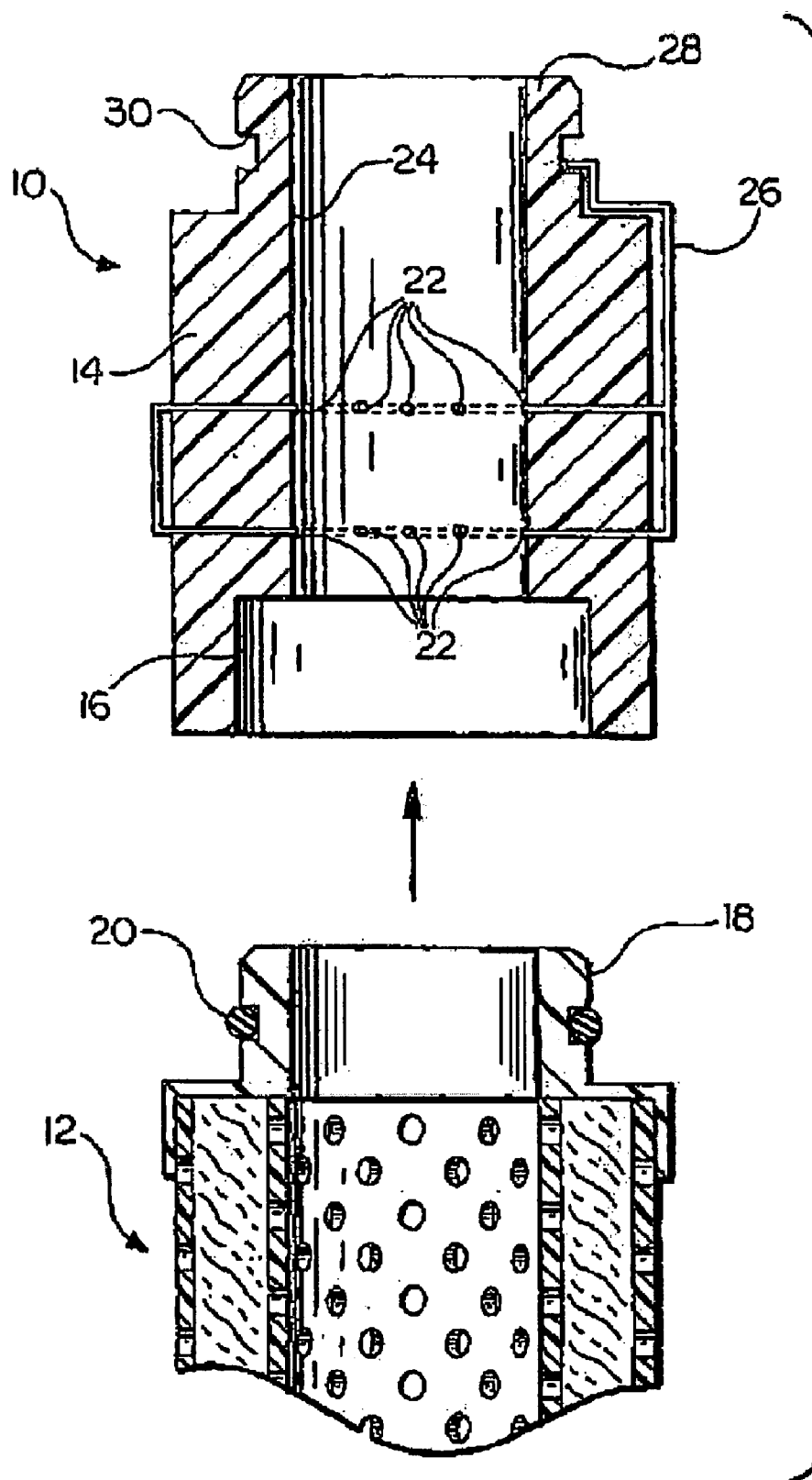
FIG. 1 is an exploded elevational view partly in section of a static charge neutralizer embodying the features of the invention and a fuel filter monitor for attachment thereto.

Reference to the drawings, there illustrated a static charge neutralizer 10 for attachment to a filter/monitor cartridge 12. The static charge neutralizer 10 consists of a cylindrical body 14 formed of a plastic material which is typically attached to outlet end of the cartridge 12 and is often commercially referred to as an end cap.

The cylindrical body 14 includes a depending skirt 16 adapted to receive the outlet end cap 18 of the cartridge 12. An O-ring seal 20 is suitably mounted to the outlet end cap 18 and is provided to achieve a fluid-tight coupling with the inner surface of the skirt 16 which depends from the main body 14 of the neutralizer 10.

A plurality of radially outwardly extending metal pins 22 are disposed within the main body 14. The innermost ends of the pins 22 are exposed to the hollow interior passage 24. The outermost ends of the pins 22 are electrically coupled together by an electrically conductive wire 26 which terminates in proximity with the outlet end 28 of the neutralizer 10.

The outlet end 28 of the neutralizer 10 terminates in the reduced diameter neck portion which typically is provided with an annular groove 30 for receiving an elastomeric O-ring used to produce a fluid-tight coupling with an exiting manifold, for example. The manifold is an integral part of the pressure vessel into which the cartridge 12 and the associated neutralizer 10 are designed to operate. The electrical conductor 26 and the pins 22 may be conveniently attached to ground through the pressure vessel.

The cartridge 12 is typically comprised of a cylindrical filter medium disposed between two substantially coextensive coaxial spaced apart tubes each having a plurality of apertures permitting the flow of fuel therethrough.

The filter media used in the cartridge 12 is capable of absorbing water and filtering particulate solid contaminants that may be present in the transient fuel. The lower end of the cartridge is provided with a solid end cap and the opposite end is provided with the hollow end cap 18. Both end caps are typically adhered to the filter media to minimize the possibility of bypassing the media, and simultaneously militating against the transmission of water.

It will be appreciated that the fuel being treated flows outside-in through the filter/monitor cartridge 12. In use, as the fuel travels through and exits the filter media of the cartridge 12, it becomes electrostatically charged. The charged fuel then flows turbulently through the center of the tubular cartridge 12 and the neutralizer 10, and contacts the innermost ends of the metal pins 22. Due to the insulative nature of the filter material, a high voltage tends to build up which may exceed 50 kV. The voltage draws charges from the pressure vessel, transferring the charge into the fuel. The polarity of the voltage field will cause either electrons to be transferred into the fuel or to exit the fuel; in either case, to neutralize the existing charges present in the fuel.

The main body 14 of the neutralizer can be made from any fuel-compatible, electrically-insulative material. These would include Teflon and its derivatives, polyester, epoxy, some nylons, Delrin, ceramic, glass, and other similar materials. Polyethylene and polypropylene, while exhibiting very good electrical properties, are not adequately compatible with hydrocarbon fuels.

Due to the nature of the application and the sensitive nature of aircraft fueling, the device is a passive device. There are no active neutralization functions, such as electrical power supplies or radiation sources, which would require further maintenance. Although typical charge generation of the filter/monitors is positive polarity, the device of the invention, based on corona discharge, can neutralize either positive or negative charges.

Performance varies with a number of design features. These include the thickness of the walls of tubular body 14, the number of metal pins 22, and the length of the tubular body 14. Thicker walls, more pins and a longer tube body will more effectively neutralize the charges.

The following is typical data, using Jet A fuel with an anti-static additive in the fuel:

| Fuel rest conductivity: | 250–300 cu (conductivity units or picosiemens/meter) |
|---|---|
| Filter/monitor: | Velcon CDF-220K |
| Fuel flowrate:. | 20 gpm |
| Wall thickness: | ½ inch |

| Device design details | | Charge generation ($\mu$C/cu m*) | | Reduction |
|---|---|---|---|---|
| Eff length | # of pins | w/o neutralizer | w/neutralizer | (%) |
| 4½ in. | 40 | 2400 | 160 | 93 |
| 2½ in. | 16 | 2400 | 480 | 80 |
| 2 in. | 16 | 2400 | 870 | 63 |

*Microcoulombs/cubic meter of fuel

Fuel, as tested, with a rest conductivity of 200–300 cu is the highest charging condition. As conductivity is increased from zero, the pro-static nature of the additive increases. Above the 300 cu level, the anti-static nature of the additive becomes more prominent. The electrical conductivity of the fuel is then high enough to dissipate the charges quickly, as the fuel exits the filter/monitor cartridge 12. Therefore, the resulting charge generation of the filter/monitor cartridge 12 is lower.

Fuel can be doped with an additive to produce a conductivity above 300 cu. However, additives typically have surfactant properties which effect the performance of water-removing coalescers in the fuel system. Guidelines have been established which specify conductivities above 50 cu. A conductivity of 250 cu is typical for fuel doped with the recommended concentration of antistatic additive.

Figure 2:
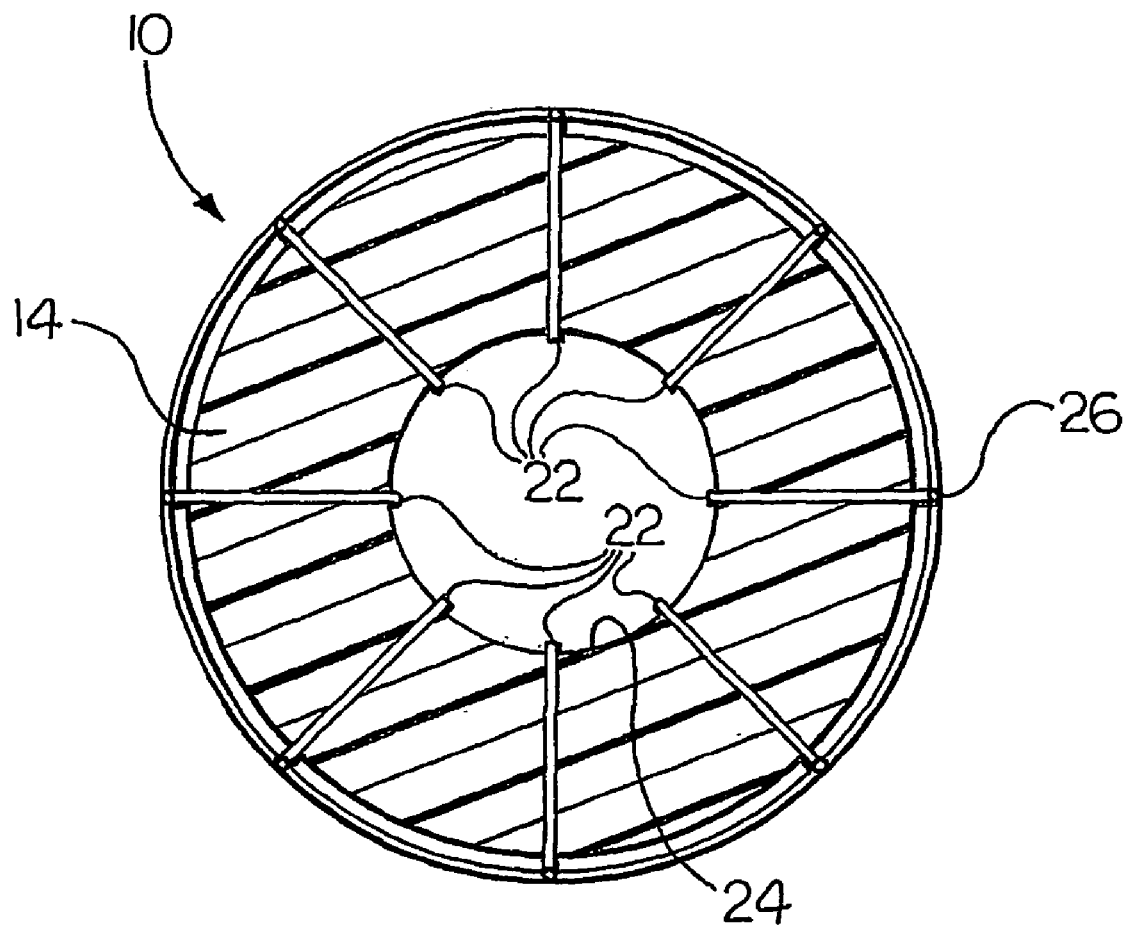
FIG. 2 is a sectional view of the neutralizer illustrated in FIG. 1 taken along line 2—2 thereof.

The tested design is configured embodiment illustrated and described in respect of FIGS. 1 and 2 with the neutralizer 10 mounted between the filter/monitor cartridge 18 and the associated vessel. The neutralizer 10 has approximately the same OD as the associated filter/monitor cartridge 12, having a nozzle configuration 28 on one end, and a skirt 16 or female receptacle on the other. The female receptacle 16 receives the filter/monitor nozzle 18. The design may be changed or altered to meet differing requirements. Length and number of pins 22 can be changed.

Of course, in current operational vessels, retrofit must be considered. The length of the neutralizer 10 must be offset by the shortening of the existing filter/monitor cartridge. In newer vessels, the neutralizer length can be added to the vessel length, and current filter/monitor cartridges can be used. The neutralizer could be reused when the filter/monitor cartridges are changed.

Figure 3:
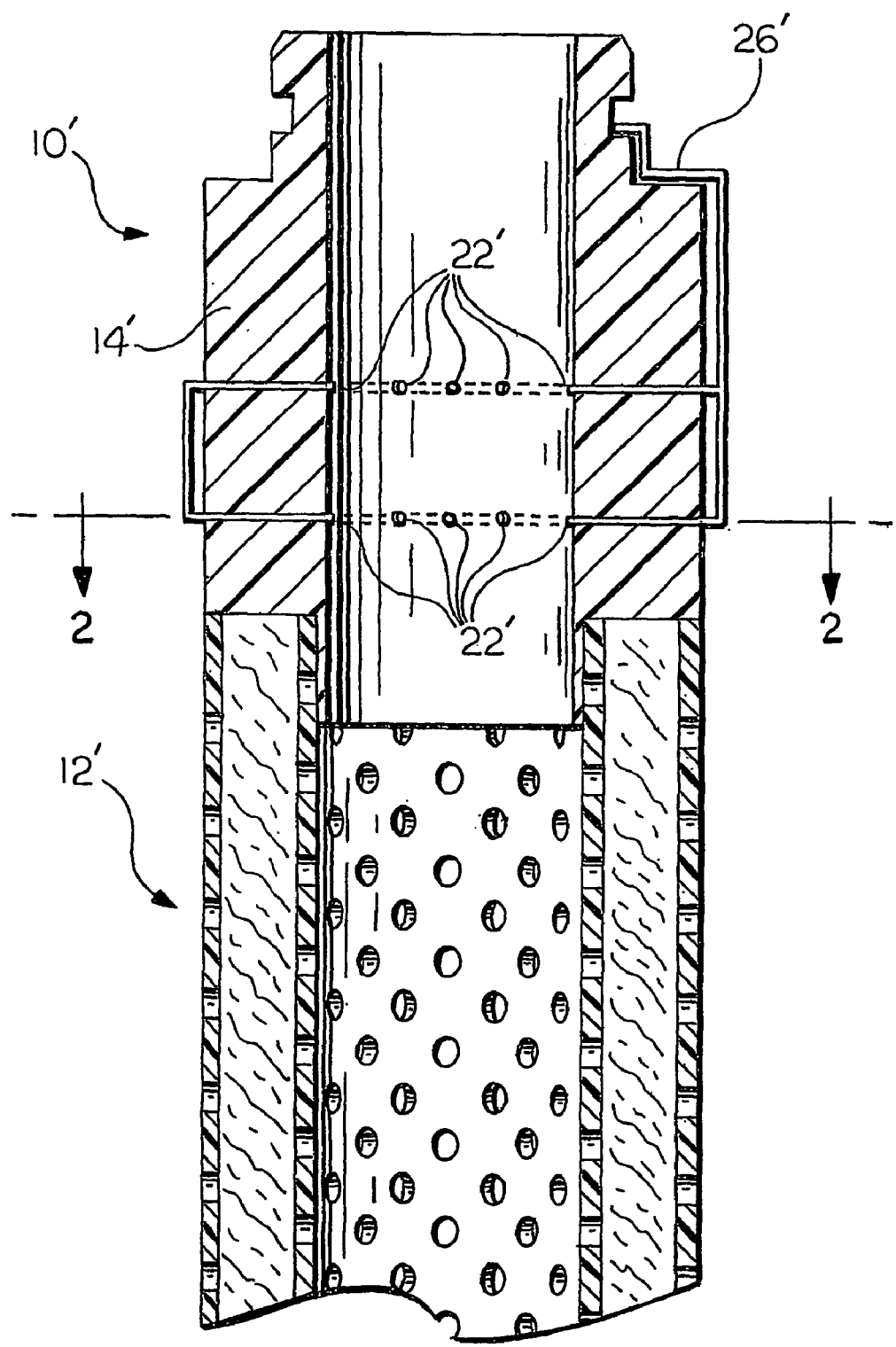
FIG. 3 is an elevational view in section of an alternative embodiment of the neutralizer illustrated in FIGS. 1 and 2 wherein the neutralizer is formed integral with a fuel filter monitor cartridge.

The neutralizer concept can also be incorporated into the design of the nozzle end cap of the filter/monitor. In such a design, the length of the end cap would be increased as required. The filter media section of the filter/monitor would be adhered at one end, as illustrated in FIG. 3. In embodiment illustrated in FIG. 3, the neutralizer 10' and the filter/monitor cartridge 12' are formed into one integral unit. Accordingly, the tubular body 14' and the associated pins 22' and the electrical conductor 26' would be discarded along with the spent filter media of the filter/monitor cartridge 12'.

Those skilled in the art can derive other configurations which could be applied to other configurations of filter elements. These generally would require different end fittings, while the basic cylindrical nature of the neutralizer is retained.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. An electrostatic neutralizer for treating a hydrocarbon fluid comprising:
   a cylindrical member having a hollow interior, said member including a fluid inlet and a spaced apart fluid outlet communicating with the hollow interior, wherein the fluid inlet includes a depending skirt for reception of a filter;
   at least one electrical conductive path formed in said member, said path being exposed to the hollow interior of said member between the inlet and outlet, wherein said at least one electrical conductive path includes an electrically conductive pin extending into the hollow interior of the cylindrical member; and
   means for interconnecting said path with electrical ground.

2. An electrostatic neutralizer as defined in claim 1 wherein the inlet of said cylindrical member is adhered to one end of a cylindrical mass of filter media.

3. An electrostatic neutralizer as defined in claim 2 wherein the depending skirt surrounds the one end of said cylindrical mass of filter media.

4. An electrostatic neutralizer as defined in claim 1 wherein said cylindrical member is formed of a plastic material.

5. An electrostatic neutralizer as defined in claim 4 wherein said plastic material is substantially electrically non-conductive.

6. An electrostatic neutralizer as defined in claim 1 including a plurality of electrically conductive paths extending outwardly from the interior of said member.

7. An electrostatic neutralizer as defined in claim 6 including means for interconnecting said paths to electrical ground.

* * * * *